(12) United States Patent
Kwon

(10) Patent No.: US 8,855,403 B2
(45) Date of Patent: Oct. 7, 2014

(54) METHOD OF DISCRIMINATING BETWEEN AN OBJECT REGION AND A GROUND REGION AND METHOD OF MEASURING THREE DIMENSIONAL SHAPE BY USING THE SAME

(75) Inventor: Dal-An Kwon, Gunpo-si (KR)

(73) Assignee: KOH Young Technology Inc., Seoul (KR)

(*) Notice: Subject to any disclaimer, the term of this patent is extended or adjusted under 35 U.S.C. 154(b) by 650 days.

(21) Appl. No.: 13/086,879

(22) Filed: Apr. 14, 2011

(65) Prior Publication Data

US 2011/0255771 A1    Oct. 20, 2011

(30) Foreign Application Priority Data

Apr. 16, 2010  (KR) .................. 10-2010-0035255
Apr. 16, 2010  (KR) .................. 10-2010-0035347

(51) Int. Cl.
*G06K 9/00* (2006.01)
*G06K 9/20* (2006.01)
*G06T 7/00* (2006.01)

(52) U.S. Cl.
CPC ............ *G06K 9/2036* (2013.01); *G06T 7/0057* (2013.01); *G06T 2207/30141* (2013.01); *G06K 9/2018* (2013.01); *G06T 2207/30148* (2013.01); *G06T 2207/10028* (2013.01); *G06T 7/0006* (2013.01)
USPC ............................ 382/151; 382/145; 382/147

(58) Field of Classification Search
None
See application file for complete search history.

(56) References Cited

U.S. PATENT DOCUMENTS 6,501,554 B1 * 12/2002 Hackney et al. ............... 356/601
7,171,036 B1 *  1/2007 Liu et al. ....................... 382/145
2009/0245614 A1 * 10/2009 Baldwin et al. ............... 382/141
2010/0134496 A1 *  6/2010 Bhaskaran et al. ........... 345/428
2013/0057650 A1 *  3/2013 Song et al. ...................... 348/46

FOREIGN PATENT DOCUMENTS

| CN | 101303223 | 11/2008 |
|---|---|---|
| JP | 07-019825 | 1/1995 |
| JP | 2000-097869 | 4/2000 |
| JP | 2002-286427 | 10/2002 |
| JP | 2003-504634 | 4/2003 |

(Continued)

OTHER PUBLICATIONS

Daley et al., "Impoved light sectioning resolution by optimized thresholding", Jan. 20, 1997, Proc. SPIE 2909, Three-Dimnesional Imaging and Laser-Based Systes for Metrology and Inspection II, pp. 151-160.*

*Primary Examiner* — Jason M Repko
*Assistant Examiner* — David Perlman
(74) *Attorney, Agent, or Firm* — Kile Park Reed & Houtteman PLLC

(57) ABSTRACT

A method of discriminating a region and a method of measuring a three dimensional shape are disclosed. The method includes irradiating light onto a substrate having a measurement target formed thereon to capture an image by receiving light reflected by the substrate, setting up an object region in which the measurement target is disposed and a ground region corresponding to a remaining region in an inspection region of the image, irradiating a grating patterned light onto the substrate having the measurement target formed thereon to capture a patterned image by receiving the grating patterned light reflected by the substrate, and obtaining height of each position in the inspection region by using the patterned image to establish a ground height with respect to the measurement target with a height of the ground region.

7 Claims, 9 Drawing Sheets

(56) References Cited

FOREIGN PATENT DOCUMENTS

| | | |
|---|---|---|
| JP | 2003-279334 | 10/2003 |
| JP | 2004-301621 | 10/2004 |
| JP | 2005-121397 | 5/2005 |
| JP | 2005-172622 | 6/2005 |
| JP | 2006-300539 | 11/2006 |
| JP | 2007-017283 | 1/2007 |
| JP | 2007-163498 | 6/2007 |
| JP | 2007-199070 | 8/2007 |
| JP | 2007-286930 | 11/2007 |
| JP | 2008-122361 | 5/2008 |
| JP | 2008-281543 | 11/2008 |
| JP | 2009-264852 | 11/2009 |

\* cited by examiner

Irradiation direction
of patterned light C

900

1000

Irradiation direction
of patterned light D

METHOD OF DISCRIMINATING BETWEEN AN OBJECT REGION AND A GROUND REGION AND METHOD OF MEASURING THREE DIMENSIONAL SHAPE BY USING THE SAME

CROSS REFERENCE TO RELATED APPLICATION

This application claims priority from and the benefit of Korean Patent Applications No. 2010-35255 filed on Apr. 16, 2010, and No. 2010-35347 filed on Apr. 16, 2010, which are hereby incorporated by reference for all purposes as if fully set forth herein.

BACKGROUND OF THE INVENTION

1. Field of the Invention

Exemplary embodiments of the present invention relate to a method of discriminating a region and a method of measuring a three dimensional shape by using the method of discriminating a region. More particularly, exemplary embodiments of the present invention relate to a method of discriminating an object region and a ground region and a method of measuring a three dimensional shape by using the method of discriminating between an object region and a ground region.

2. Discussion of the Background

Electronic devices have been developed to have relatively lighter weight and smaller size. Therefore, possibility of defects in these electronic devices increases and an apparatus for inspecting the defects is under development and improvement.

Recently, the technique for inspecting a three-dimensional shape becomes effective in various technical fields. For inspecting a three-dimensional shape, a coordinate measurement machine (CMM), which detects a three-dimensional shape by a contacting method, has been used. However, a non-contact method for inspecting a three-dimensional shape by using optical theories has been under development.

According to a method of measuring three dimensional shape by moiré effect, which is a representative non-contact method, a grating patterned light is irradiated onto an target object, shifting a phase of grating patterned light to measure the height of each point (x,y) of the target object in an xy plane.

In more detail, the grating patterned light is irradiated onto a measurement region (FOV: Field of View) to inspect a measurement region (ROI: Region of Interest) on which a measurement target is formed. However, when there is warpage of a substrate, a real position of the object region is not coincides with the position of CAD design, so that accuracy of measurement is lowered.

Especially, as shown in FIG. 1, when measuring a printed circuit board having a plurality of bumps for a semiconductor, measurement targets are disposed in compact. Therefore, it is very hard to discriminate an object region and a ground region (B) disposed outside of the object region.

SUMMARY OF THE INVENTION

Exemplary embodiments of the present invention provide a method of discriminating between an object region and a ground region, which is capable of enhancing accuracy of measurement.

Furthermore, exemplary embodiments of the present invention provide a method of measuring a three dimensional shape by using the above method.

Additional features of the invention will be set forth in the description which follows, and in part will be apparent from the description, or may be learned by practice of the invention.

An exemplary embodiment of the present invention discloses a method of measuring three dimensional shape. The method includes irradiating light onto a substrate having a measurement target formed thereon to capture an image by receiving light reflected by the substrate, setting up an object region in which the measurement target is disposed and a ground region corresponding to a remaining region in an inspection region of the image, irradiating a grating patterned light onto the substrate having the measurement target formed thereon to capture a patterned image by receiving the grating patterned light reflected by the substrate, and obtaining height of each position in the inspection region by using the patterned image to establish a ground height with respect to the measurement target with a height of the ground region.

For example, irradiating light onto a substrate having a measurement target formed thereon to capture an image by receiving light reflected by the substrate, may be performed by irradiating light onto measurement target toward the measurement target in a vertical direction.

For example, irradiating light onto measurement target toward the measurement target in a vertical direction may be performed by a reflection mirror.

For example, setting up an object region in which the measurement target is disposed and a ground region corresponding to a remaining region in an inspection region of the image, may include obtaining intensity of each position in the inspection region from the image, generating a grayscale histogram by setting the intensity to be a first axis and the number of positions corresponding to the intensity to be a second axis, and setting up the object region and the ground region from the grayscale histogram.

For example, the inspection region may be a field of view (FOV), and the ground region may be a common ground region of all measurement targets in the FOV.

For example, setting up the object region and the ground region from the grayscale histogram, may include determining a region corresponding to the minimum number in the grayscale histogram to be a boundary between the object region and the ground region, or positions to be the boundary between the object region and the ground region, the positions being determined such that the object region expand toward the boundary region.

For example, the inspection region may be set up such that the inspection region includes at least two measurement targets, and the ground region may be set up to be a ground region of one of the two measurement target.

An exemplary embodiment of the present invention discloses a method of discriminating between an object region and a ground region. The method includes irradiating grating patterned light onto a measurement target, changing grating pattern, to obtain grating patterned image by receiving the grating patterned light reflected by the measurement target, obtaining a resultant image of at least one of average, maximum value, minimum value, modulation, visibility, phase and signal to noise ratio in each position of the grating patterned image, and discriminating the object region and the ground region by using the resultant image.

For example, irradiating grating patterned light onto a measurement target, changing grating pattern, to obtain grating patterned image by receiving the grating patterned light reflected by the measurement target, may include irradiating grating patterned light in at least two different directions, and discriminating the object region and the ground region by using the resultant image, may include generating a merged image of at least one of a logical product image, a logical sum image and an image generated by subtracting the logical product image from the logical sum image, of the resultant image in the at least two direction.

Another exemplary embodiment of the present invention discloses a method of discriminating between an object region and a ground region. The method includes determining a type of a light source between a light source generating a light and a light source generating a grating patterned light, in accordance with a surface roughness of a measurement target, discriminating between the object region and the ground region by a first step, when the surface roughness of the measurement target is lower than a predetermined value, and discriminating between the object region and the ground region by a second step, when the surface roughness of the measurement target is higher than the predetermined value. The first step includes irradiating the light through the light source generating a light, receiving the light reflected by the measurement target to capture an image, and discriminating between the object region and the ground region by using the image. The second step includes irradiating the grating patterned light through the light source generating the grating patterned light onto the measurement target in at least one direction, shifting a grating pattern, to obtain a grating patterned image by receiving the grating patterned light reflected by the measurement target, and discriminating the object region and the ground region by using the patterned image.

For example, discriminating between the object region and the ground region by using the image, may include obtaining intensity of each position in the inspection region from the image, generating a grayscale histogram by setting the intensity to be a first axis and the number of positions corresponding to the intensity to be a second axis, and obtaining a boundary between the object region and the ground region to discriminate the object region and the ground region.

For example, the light may be irradiated onto measurement target in a vertical direction.

Another exemplary embodiment of the present invention discloses a method of measuring three dimensional shape. The method includes irradiating a plurality of patterned lights onto a substrate to capture patterned images by receiving the patterned light reflected by the substrate, merging the patterned images to generate an image, obtaining intensity of each position in the inspection region from the image, generating a grayscale histogram by setting the intensity to be a first axis and the number of positions corresponding to the intensity to be a second axis, obtaining height of each position in the inspection region by using the patterned images, discriminating an object region and a ground region by using the histogram, and setting up a height of the ground region as a ground height with respect to a measurement target.

For example, the inspection region may be set up such that the inspection region includes at least two measurement targets, and the ground region is set up to be a ground region of one of the two measurement target.

For example, the inspection region may be a field of view (FOV), and the ground region may be a common ground region of all measurement targets in the FOV.

For example, a top surface of the measurement target may be flat.

For example, discriminating an object region and a ground region by using the histogram, may include determining a region corresponding to the minimum number in the grayscale histogram to be the boundary between the object region and the ground region, or positions to be the boundary between the object region and the ground region, the positions being determined such that the object region expand toward the boundary region.

According to the present invention, when a position of the measurement target is ambiguous due to a warpage of a substrate, a misposition error of solder, an overdose or an under dope of solder, etc., the boundary of the measurement target and a substrate may be clearly defined by using two dimensional image that is measured, and reliability of a ground phase obtained by averaging phases of ground (or substrate) defined by the boundary may be enhance.

Further, measurement accuracy may be enhanced by coinciding ground phases of the ground regions in the inspection region measured in at least two directions, and time required for measuring three-dimensional shape may be reduced, since the ground phases may be applied to all inspection regions measured in all direction without separately discriminating the object region and the ground region that are measured in all directions.

Additionally, when discriminating the ground region is not easy and the area of the ground region is relatively small since the measurement targets are compactly disposed in the measurement region, the ground phase of entire measurement region may be obtained to enhance reliability of the ground phase and repeatability.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
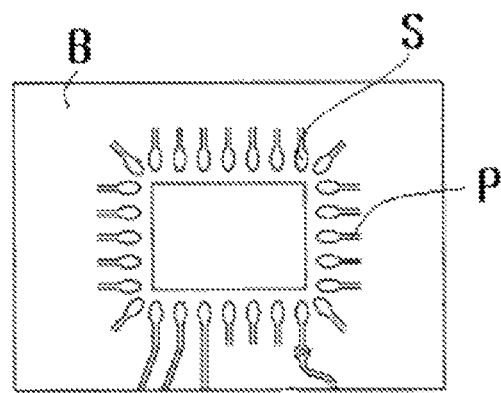
FIG. 1 is a plan view showing a field of view in which measurement targets are disposed, the measurement targets being solders corresponding to bumps of a semiconductor.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a method of measuring a three dimensional shape by shifting moiré pattern will be explained for understanding the present invention.

In the method of measuring a three dimensional shape by shifting moiré pattern, a grating patterned light formed by passing a light through a grating pattern is irradiated onto a measurement target and then a grating patterned image reflected by the measurement target is captured to measure a three dimensional shape of the measurement target.

Then, intensity value of a position (x, y) may be expressed as following Expression 1. In this case, the position (x, y) corresponds to a surface of a substrate which corresponds to XY-plane.

$$I_k = A + B \cos(\Phi + \delta_k) \quad \text{Expression 1}$$

In Expression 1, '$I_k$' is intensity, 'A' is an average value of $I_k$, 'B' is a modulation. For example, in a 4-bucket algorithm, subscript k changes from 1 to 4, and $\delta_1, \delta_2, \delta_3$ and $\delta_4$ are 0, $\pi/2$, $\pi$, 3 and $\pi$, respectively.

Then, Phase $\Phi$ in Expression 1 may be Expressed as Following Expression 2 by Using $I_1, I_2, I_3$ and $I_4$.

$$\Phi(x, y) = \tan^{-1}\left[\frac{(I_4 - I_2)}{(I_1 - I_3)}\right] \quad \text{Expression 2}$$

The phase $\Phi$ in Expression 2 is proportional to height h as shown in following Expression 3.

$$h(x, y) = \frac{\Lambda}{2\pi}\Phi(x, y) \quad \text{Expression 3}$$

In Expression 3, '$\Lambda$' is moiré equivalence wavelength.

Using the above Expressions, the phase $\Phi(x,y)$ corresponding to each position (x,y) is firstly obtained from intensity $I_k$ which is obtained by a grating patterned light reflected by a target object, and then height h(x,y) is obtained to measure three dimensional shape of the measurement target.

Figure 2A:
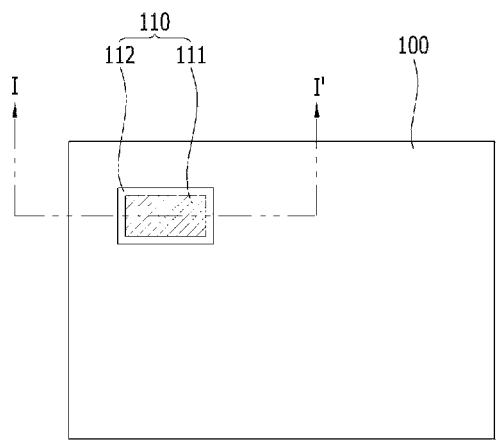
FIG. 2A is a plan view showing a measurement region captured by an image capturing part of an apparatus for measuring a three dimensional shape by shifting a moiré pattern.
Figure 2B:
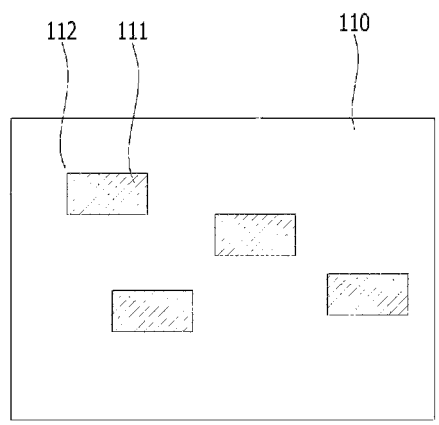
FIG. 2B is a plan view showing a measurement region in which a plurality of measurement targets are disposed, when the measurement region are the same as the inspection region.
Figure 3:
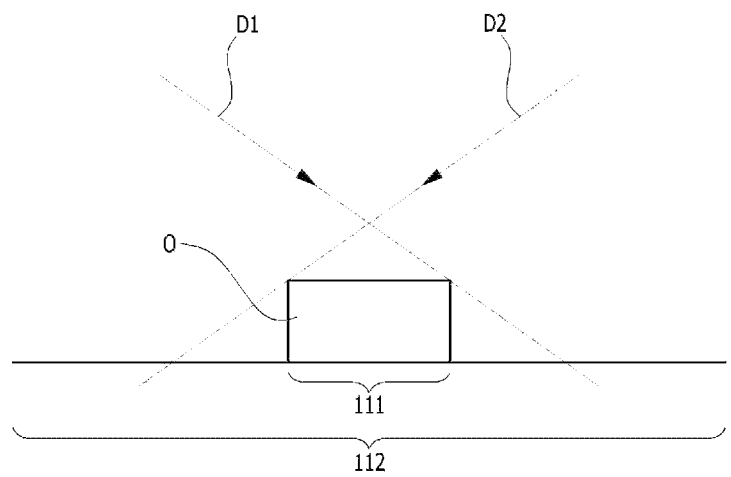
FIG. 3 is a cross-sectional view taken along a line I-I' in FIG. 2A, when a surface of a measurement target is smooth.

FIG. 2A is a plan view showing a measurement region captured by an image capturing part of an apparatus for measuring a three dimensional shape by shifting a moiré pattern. FIG. 2B is a plan view showing a measurement region in which a plurality of measurement targets are disposed, when the measurement region are the same as the inspection region. FIG. 3 is a cross-sectional view taken along a line I-I' in FIG. 2A, when a surface of a measurement target is smooth.

Referring to FIG. 2A and FIG. 3, a measurement region (FOV: Field Of View) 100 captured by an image capturing part of an apparatus for measuring a three dimensional shape includes, generally a plurality of inspection regions (ROI: Region Of Interest) 110, and each of the inspection regions 110 includes an object region 111 in which a measurement target is disposed and a ground region 112 disposed outside of the object region 111. Alternatively, as shown in FIG. 2B, the inspection region 110 may be substantially the same as the measurement region 100 in FIG. 2A, and the inspection region 110 may include a plurality of object regions 111, each of which corresponds to a plurality of measurement targets. For example, the plurality of measurement targets, each of which corresponds to the plurality of object regions 111, may be a coin type bump that will be explain later.

A grating patterned light may be irradiated toward the measurement target O in a slanted direction, for example, in a first direction D1 or a second direction D2 as shown in FIG. 3. Therefore, the three dimensional shape of the measurement target cannot be measured accurately sometimes. In detail, when a grating patterned light is irradiated toward the measurement target O in the first direction D1, a shadow region may be generated in the right side of the measurement target O. On the contrary, when a grating patterned light is irradiated toward the measurement target O in the second direction D2, a shadow region may be generated in the left side of the measurement target O. In order to measure a three dimensional shape of a portion of the measurement target O, which corresponds to a shadow region, the phase of the measurement target O is measured in both sides of the measurement target O. Alternatively, a grating patterned light may be irradiated in more than two directions.

Figure 4:
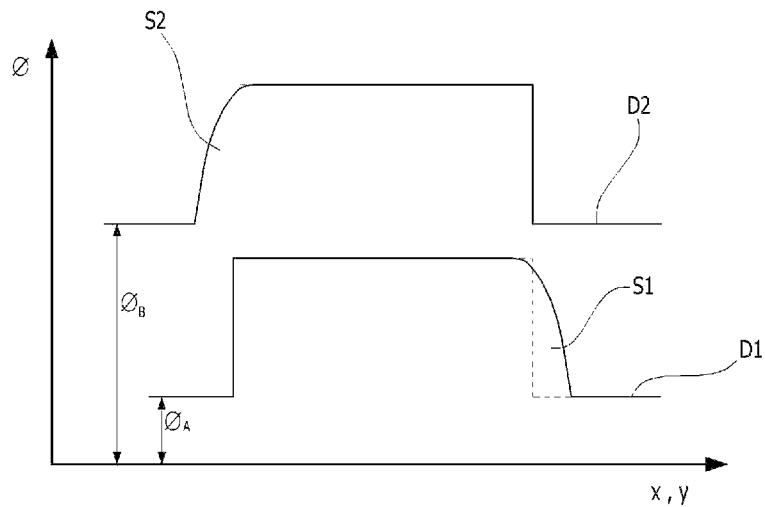
FIG. 4 is a phase diagram of the measurement target in FIG. 3.

FIG. 4 is a phase diagram of the measurement target in FIG. 3.

Referring to FIG. 4, the phase measured by irradiating a grating patterned light in the first direction D1 in FIG. 3 may include errors S1 at the right side of the measurement target, and the phase measured by irradiating a grating patterned light in the second direction D2 in FIG. 3 may include errors S2 at the left side of the measurement target. Therefore, when phases of the measurement target are measured in both directions and revised to discriminate the object region, relatively exact height of the measurement target can be measured.

On the other hand, according to the phase shift method using moiré pattern, a relative height is measured, instead of absolute height. Therefore, as shown in FIG. 4, the ground phase $\Phi_A$ which corresponds to a phase of the ground region measured in the first direction D1 may not coincide with the ground phase $\Phi_B$ which corresponds to a phase of the ground region measured in the second direction D2, so that the two ground phases $\Phi_A$ and $\Phi_B$ are required to coincide with each other.

In order for that, the object region 111 and the ground region 112 disposed outside of the object region 111 in the inspection region 110 which is a portion of the measurement region 100 should be discriminated.

Figure 5:
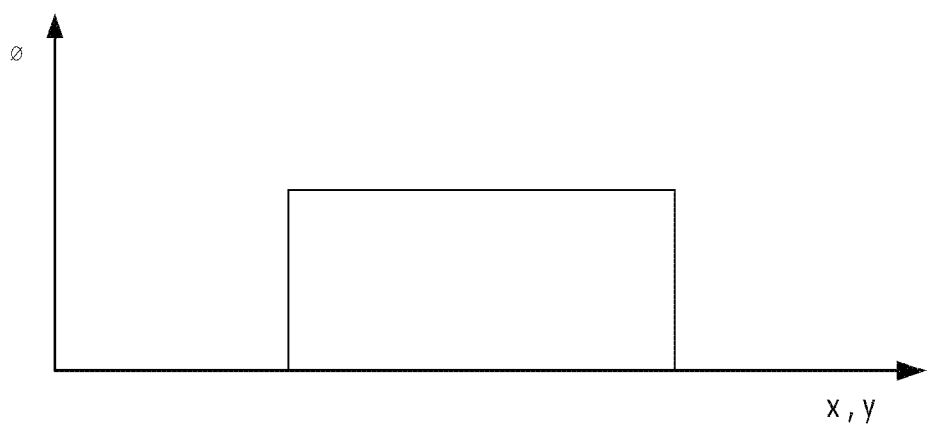
FIG. 5 is a revised phase diagram of the phase diagram in FIG. 4.

Then, phases of each point (x,y) in the ground region are averaged to obtain the ground phase, and the ground phase is subtracted from phases of each point (x,y) in the object region to shift the phases of each point (x,y) in the object region. Then, shadow region is removed by using two phases measured in both direction and shifted by the ground phase to obtain the phase diagram in FIG. 5, and heights of each region (x,y) in the object region are measured by using Expression 3 to obtain the three dimensional shape of the measurement target.

In one exemplary embodiment of the present invention, in order to discriminate the object region and the ground region, a two dimensional image of the substrate having the measurement target formed thereon is obtained. In other words, intensities of each point (x,y) in the inspection region are measured to discriminate the object region and the ground region. The two dimensional image may be one colored image of white or a plurality of colored image.

In order for that, a pad referencing process for compensating distortion between a reference data and the two dimensional image by using characteristic value of a substrate (for example, a particular shape of wiring patterns, etc.) to set the measurement region exactly, may optionally be performed. In detail, an object region is preliminarily set first in the one colored image of white or a plurality of colored image that will be described later by using design or manufacturing data, and then the object region and the ground region may be exactly discriminated. As described above, when the pad referencing is performed, positions of the object region and the ground region may be perceived, so that times required for discriminating the object region and the ground region may be reduced.

At first, a method for discriminating the object region and the ground region by using one colored image of white will be explained.

White light is irradiated onto the inspection region or the measurement region, and then intensities of each region in the inspection region are obtained. Preferably, the intensities are obtained in the entire measurement region. When the intensities of the entire measurement region are obtained to calculate the ground phases of the entire measurement region, the same ground phase may be used to inspect other inspection region in the same measurement region. Therefore, repetitiveness may be enhanced. Furthermore, when the object region is much larger than the ground region in the measurement region, the ground phase of the ground region may be obtained, not exactly. In this case, a more exact ground phase may be applied when the ground phase of the entire measurement region is obtained.

Then, a grayscale histogram is generated by setting the intensity to be a first axis and the number of positions (or frequency number) corresponding to the intensity to be a second axis, and boundary between the object region and the ground region are obtained by using the grayscale histogram.

In detail, in order to get intensities of each point of the measurement region, a light is irradiated onto the measurement target and the light reflected by the measurement target is captured to obtain intensities of each point of the measurement.

When irradiating a light onto measurement target, it is very important to control the light such that all points of measurement region receive the light with regular intensity. When the light is controlled such that all points of measurement region receive the light with different intensity, measurement accuracy may be deteriorated. In order for that, the light may be irradiated onto the measurement target in a vertical direction.

According to one method for controlling the light such that all points of measurement region receive the light with the same intensity, a light source and an image capturing part for capturing the two dimensional image may be disposed such that the measurement target, the image capturing part and the light source are disposed along a vertical line. According to other method, light sources arranged along a concentric circle over the measurement region or light sources arranged in a dome shape may irradiate light on the measurement region. Alternatively, a light source may be disposed at a side, and the light path may be adjusted such that the light arrives at the measurement target in a vertical direction by using a reflection mirror.

With the intensities of each point (x,y) in the measurement region, the grayscale histogram is generated by setting the intensity to be a first axis and the number of positions corresponding to the intensity to be a second axis.

Figure 6:
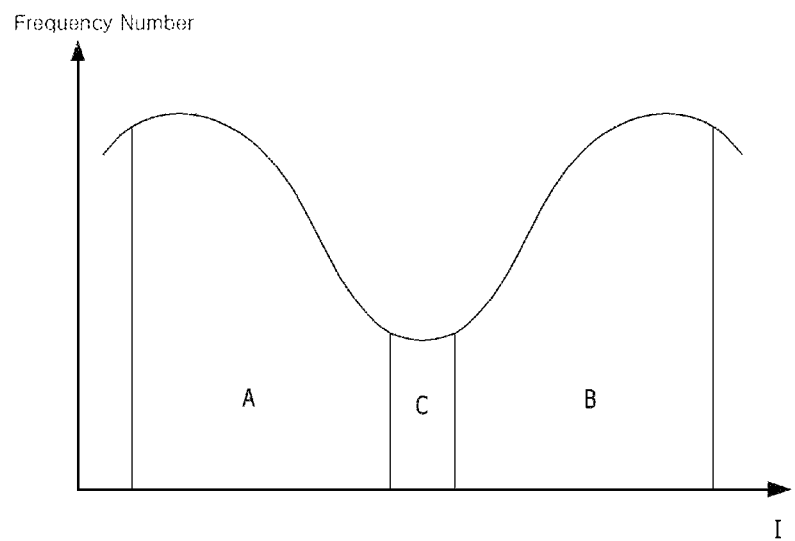
FIG. 6 is a grayscale histogram of a frequency number corresponding to intensity.
Figure 7A:
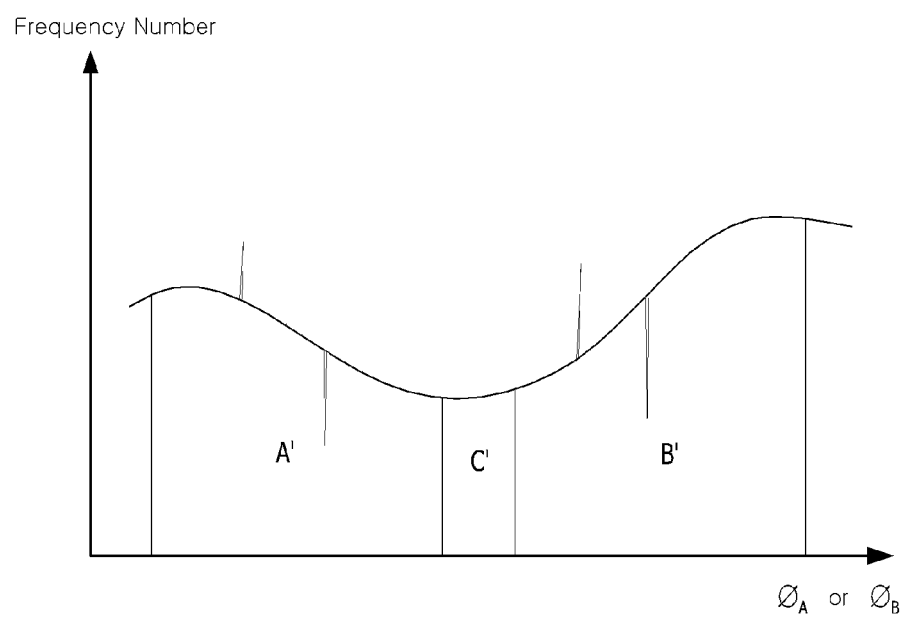
FIGS. 7A and 7B are phase histograms of a frequency number corresponding to phase, which are respectively showing a state in which noises are present and a state in which noises are removed.
Figure 7B:
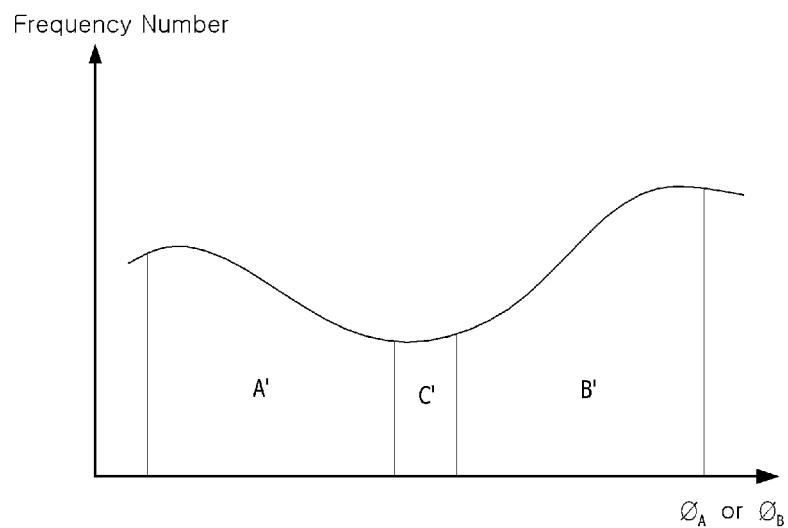
Figure 8:
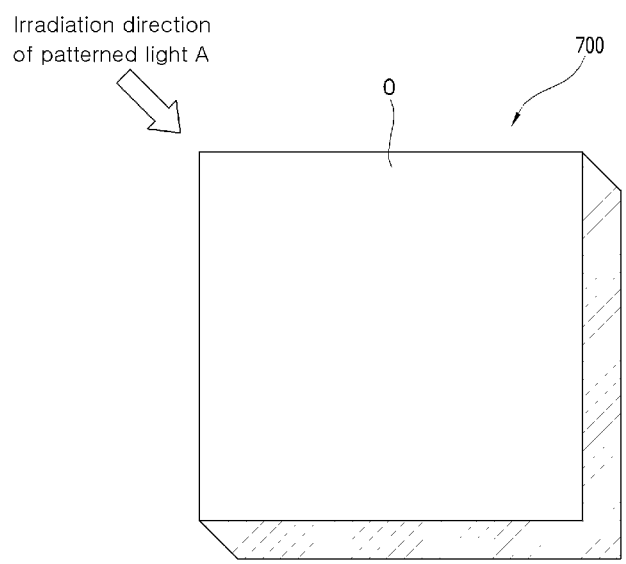
FIG. 8 through FIG. 11 are diagrams showing resultant images of various grating patterned light directions.
Figure 9:
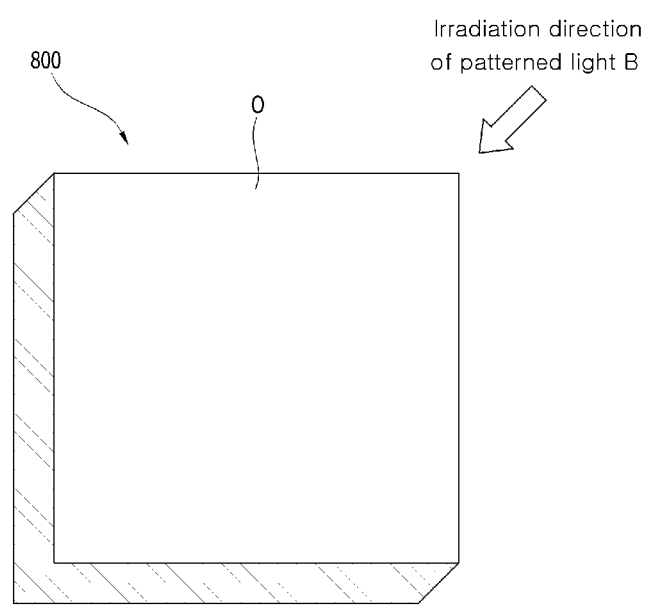
Figure 10:
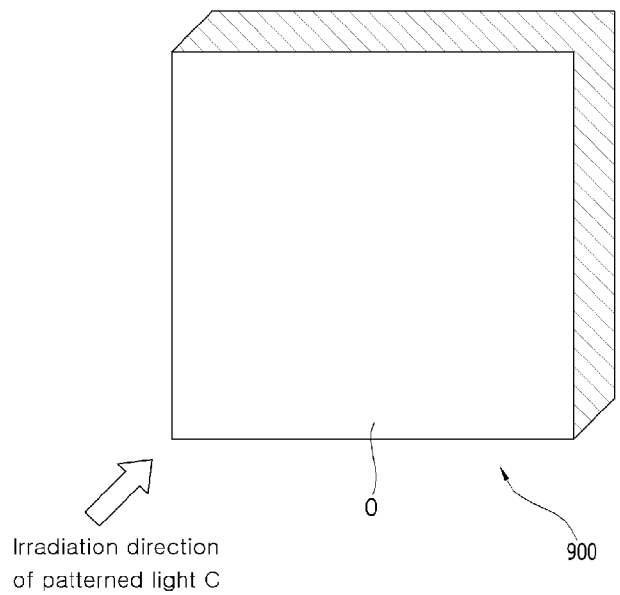
Figure 11:
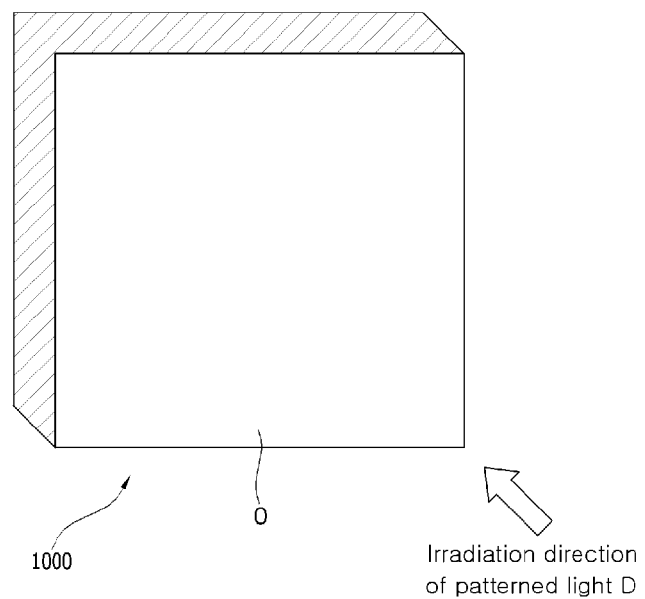

FIG. 6 is a grayscale histogram of a frequency number corresponding to intensity, and FIGS. 7A and 7B are phase histograms of a frequency number corresponding to phase, which are respectively showing a state in which noises are present and a state in which noises are removed.

Referring to FIG. 6, for example, one of the A-region of relatively lower intensity and the B-region of relatively higher intensity corresponds to the object region, and the other corresponds to the ground region. When the reflectivity of the measurement target is higher than that of ground region, [for example, when solder (measurement target) is disposed on a PCB substrate (ground region)], the intensity of the measurement target is relatively higher and the intensity of the ground region is relatively lower. In this case, the A-region corresponds to the ground region and the B-region corresponds to the object region. On the contrary, when the reflectivity of the measurement target is relatively lower than that of the ground region, the intensity of the measurement target is relatively lower and the intensity of the ground region is relatively higher. In this case, the B-region corresponds to the ground region and the A-region corresponds to the object region.

In this case, the C-region with smaller frequency number, which is disposed between the A-region with relatively lower intensity and the B-region with relatively higher intensity, may correspond to the boundary region between the object region and the ground region.

On the other hand, the region corresponding to a CAD data for forming the measurement target or an edge of an opening portion of a stencil may correspond to the boundary region between the object region and the ground region.

Referring to FIG. 7A, the method may further include a step of removing noises, considering a position information of reference data, a size of the object region and correlation of circumference. In detail, a hole for connecting wiring patterns of a PCB substrate, and silkscreen pattern regions and OCR regions formed on a printed circuit board through a silkscreen printing method are removed by the position information of reference data. Light sinks at the hole, and light is saturated by the silkscreen pattern region and the OCR region, so that the hole, the silkscreen pattern region and the OCR region operate as noises. Additionally, considering correlation of circumference, regions of abrupt change may be regarded as noises to be removed.

Referring to FIG. 7B, the regions corresponding of the intensity with the minimum number in the grayscale histogram are set to be the boundary between the object region and the ground region, and then phases of ground region A' corresponding to the ground region are averaged to obtain the ground phase. Alternatively, considering the shadow region, the object region may be expanded to set a new boundary, and phases corresponding to the ground region may be averaged to get the ground phase.

Alternatively, in order to obtain the boundary region between the object region and the ground region from the grayscale histogram, Otsu algorithm may be used to determine the boundary region between the object region and the ground region, or the object region determined by Otsu algorithm may be expanded to set a new boundary, and the phases of a ground region determined by the new boundary may be averaged to obtain ground phase.

According to the method of determining the boundary region between the object region and the ground region by Otsu algorithm, a boundary T is preliminarily set first by estimation. For example, in order to estimate the boundary T between the object region and the ground region, CAD data may be used. Alternatively, the region with minimum frequency number in the above described grayscale histogram may be estimated to be the preliminary boundary T.

Then, the object region G1 and the ground region G2 are divided by the preliminary boundary T that is estimated, and the intensity average m1 in the object region and the intensity average m2 in the ground region are calculated.

Using the intensity average m1 in the object region and the intensity average m2 in the ground region, a new boundary is set such that the new boundary corresponds to an average of the intensity average m1 and the intensity average m2 [T= (m1+m2)/2)], and above processes are continued until the difference between the present boundary and the previous boundary is smaller than a critical value ($\epsilon$).

The above method is one example of Otsu algorithm, and various Otsu algorithms may be applied.

According to another embodiment, in order to discriminate an object region and a ground region, a plurality of colored lights are irradiated onto a measurement region to capture a plurality of colored images. For example, a red-colored light, a green-colored light and a blue-colored light are irradiated onto a measurement region, respectively, and a red-colored image, a green-colored image and a blue-colored image corresponding to the red-colored light, the green-colored light and the blue-colored light are obtained.

Since the red colored light, the green colored light and the blue colored light have different wavelength from each other, the red colored image, the green colored image and the blue colored image in the measurement region have different image distribution due to chromatic aberration. In order to discriminate the ground region B except for the solder S and the wiring pattern P in FIG. 1, a color information map containing color information that can discriminate material may be used.

For example, when a saturation map is used, the ground region B may be discriminated from the solder S and the wiring pattern P. In general, the measurement target (for example, solder S) is close to achromatic color. Therefore, a region with near zero value in the saturation map may be determined to be the object region. For example, the solder S and the wiring pattern P in FIG. 1 have achromatic color. Therefore, when the region with achromatic color is removed from the substrate, the ground region B may be obtained from the substrate.

In order to generate a saturation map, HSI information containing hue, saturation (chroma) and intensity (brightness) is obtained through color coordinate transformation. The color coordinate transformation for transforming the RGB information into the HSI information is well known to a person ordinary skilled in the art. Therefore, any further explanation will be omitted.

Optionally, before color coordinate transformation, each colored image may undergo a process of easing saturation through applying an average filter to the colored image.

Then, a saturation map is formed by using the saturation information by pixel in the HSI information.

The saturation map may be generated by the saturation information by each pixel of red colored image, green colored image and blue colored image. In detail, the saturation map may be generated by saturation calculated by following Expression 4.

$$\text{saturation} = \left(1 - 3\frac{\text{Min}(R, G, B)}{(R + G + B)}\right) \quad \text{Expression 4}$$

In Expression 4, 'R' is saturation information regarding each pixel in the red colored image, 'G' is saturation information regarding each pixel in the green colored image, and 'B' is saturation information regarding each pixel in the blue colored image.

The saturation map generated by Expression 4 has a value ranged from zero to one. When the saturation map is closer to one 1, it represents primary color. Through this method, the ground region may be discriminated, and the ground phase may be obtained by averaging phases of the ground region.

The above explained embodiments are advantages for the target object corresponding to coin type bumps with a smooth top surface in the coin type bumps of semiconductor manufacturing process. Since the top surface of the coin type bump, which is formed through processes of solder paste spreading, solder paste reflowing, and solder paste pressing to have planarized top surface for enhancing electrical contact, has relatively high reflectivity to be clearly discriminated from surface of the substrate, which has relatively low reflectivity. As described above, after the solder paste reflow process, total reflection increases so that clear discrimination between the object region and the ground region may be accomplished.

According to another exemplary embodiment of the present invention, in order to discriminate the object region and the ground region, a grating patterned light is irradiated onto the measurement target at least one direction, by shifting grating patterns, and the grating patterned light reflected by the measurement target is captured. In this case, the grating patterned light is irradiated onto the measurement target in a direction forming a specific angle with respect to a vertical line connecting the measurement target and an image capturing part of an apparatus for measuring a three dimensional shape. Then, a resultant image (an image generated by merging the patterned images) is obtained, which is a result of operation that is at least one of an average A, maximum value Max, minimum value Min, modulation B, visibility γ, signal to noise ratio SNR and phase Φ of the grating patterned light irradiated onto the measurement target by shifting grating patterns to be reflected by the measurement target. The average A may be expressed as following Expression 5, the maximum value Max may be expressed as following Expression 6, the minimum value Min may be expressed as following Expression 7, the modulation B may be expressed as following Expression 8, the visibility γ may be expressed as following Expression 9, the signal to noise ratio SNR may be expressed as following Expression 10 and the phase Φ may be expressed as above explained Expression 2.

$$A(x, y) = \frac{I_1 + I_2 + I_3 + I_4}{4} \quad \text{Expression 5}$$

$$\text{Max}(x, y) = \max(I_1, I_2, I_3, I_4) \quad \text{Expression 6}$$

$$\text{Min}(x, y) = \min(I_1, I_2, I_3, I_4) \quad \text{Expression 7}$$

$$B(x, y) = \frac{\sqrt{(I_1 - I_3)^2 + (I_2 - I_4)^2}}{2} \quad \text{Expression 8}$$

$$\gamma(x, y) = \frac{B}{A} - \frac{2\sqrt{(I_1 - I_3)^2 + (I_2 - I_4)^2}}{I_1 + I_2 + I_3 + I_4} \quad \text{Expression 9}$$

$$SNR(x, y) = \frac{B(x, y)}{TemperalNoise(A)} \quad \text{Expression 10}$$

Above described Expression 5 through Expression 10 are obtained from Expression 1.

Then, using the image (or the resultant image), the object region and the ground region outside of the object region may be discriminated using the image, or after obtaining a merged image of the resultant images in at least one direction, the object region and the ground region disposed may be discriminated using the merged image.

Figure 12:
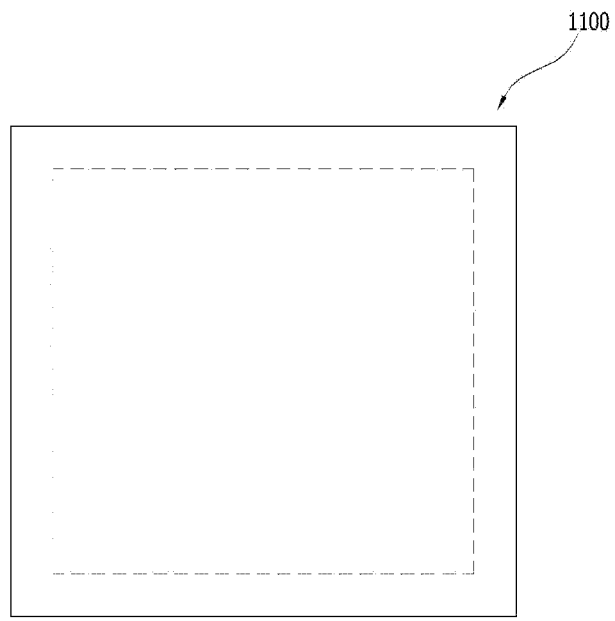
FIG. 12 is a diagram showing a logical sum region of resultant images in FIG. 8 through FIG. 11.
Figure 13:
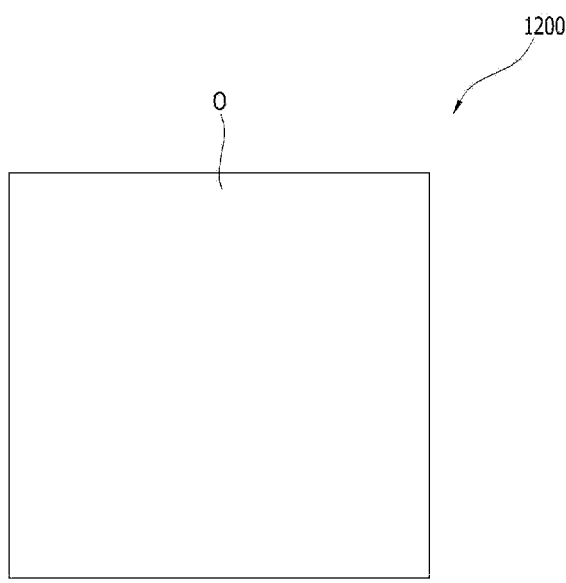
FIG. 13 is a diagram showing a logical product region of resultant images in FIG. 8 through FIG. 11.
Figure 14:
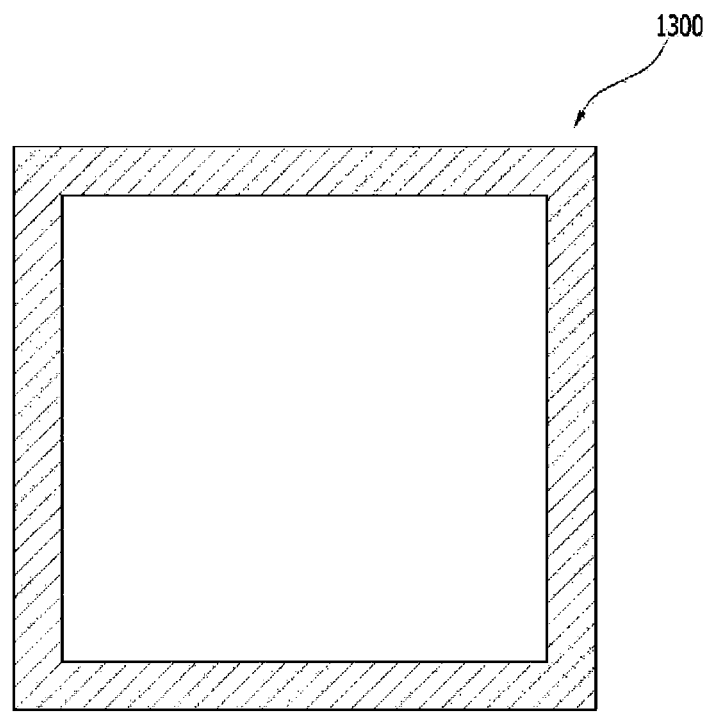
FIG. 14 is a diagram showing a boundary region between an object region and a ground region, which is obtained by subtracting the logical product region in FIG. 13 from the logical sum region in FIG. 12.

FIG. 8 through FIG. 11 are diagrams showing resultant images of various grating patterned light directions. FIG. 12 is a diagram showing a logical sum region of resultant images in FIG. 8 through FIG. 11. FIG. 13 is a diagram showing a logical product region of resultant images in FIG. 8 through FIG. 11. FIG. 14 is a diagram showing a boundary region between an object region and a ground region, which is obtained by subtracting the logical product region in FIG. 13 from the logical sum region in FIG. 12.

Referring to FIG. 8 through FIG. 11, according to irradiation direction A, B, C and D of grating patterned light, resultant images 700, 800, 900 and 1000 of the measurement target O may be generated due to, for example, shadow regions.

Next, referring to FIG. 12, a logical sum image 1100 is generated by logical summing the resultant images 700, 800, 900 and 1000. Here, 'logical sum' does not mean the mathematical logical sum, but means treating regions as the object region, which seem to be different between the object region or the ground region according to irradiating direction.

Next, referring to FIG. 13, a logical product image 1200 is generated by logical producting the resultant images 700, 800, 900 and 1000. Here, 'logical product' does not mean the mathematical logical product, but means treating regions as the ground region, which seem to be different between the object region or the ground region according to irradiating direction.

Next, referring to FIG. 14, the region that is generated by subtracting logical product image 1200 from the logical sum image 1100 is treated as the region 1300 between the object region and the ground region. Alternatively, the boundary region may be shifted in such a way that increases the object region to set a new boundary, and outside of the new boundary may be determined to be the ground region.

Then, by averaging the phase of the ground region that is determined above process, the ground phase may be obtained.

According to another exemplary embodiment for discriminating between an object region in which a measurement target is disposed, and a ground region disposed outside of the object region in an inspection region that is a part of the measurement region, two above explained embodiments are adapted.

In detail, a type of a light source between a light source generating a light and a light source generating a grating patterned light is determined first in accordance with surface roughness of a measurement target.

Figure 15:
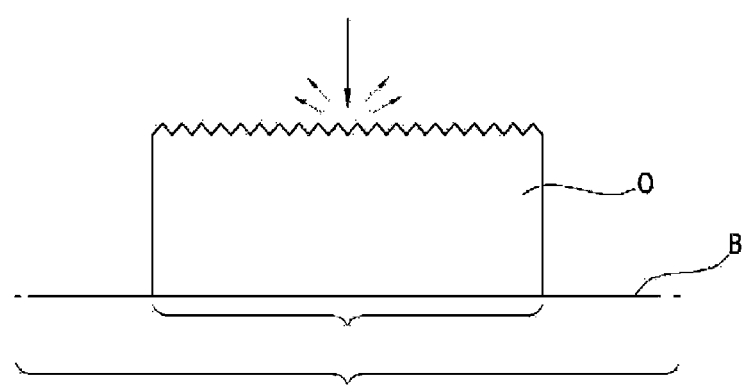
FIG. 15 is a cross-sectional view taken along a line I-I' in FIG. 2A, when a surface of a measurement target is rough.

FIG. 15 is a cross-sectional view taken along a line I-I' in FIG. 2A, when a surface of a measurement target is rough. As shown in FIG. 15, when the top surface of the measurement target O is rough, the difference between the intensity of the ground surface B of a substrate and the intensity of the measurement target may be small. In general, the reflectivity of the measurement target O such as a solder is higher than that of the ground surface B of the substrate, so that the measurement target O may be easily discriminated. However, when the top surface of the measurement target O is rough, the light arriving at the measurement target O is scattered to reduce the intensity, so that it is hard to discriminate the measurement target O from the ground surface B. In this case, accuracy of discriminating between the measurement target O and the ground region through two dimensional image (or intensity) obtained by using a light may be lowered.

Therefore, the exemplary embodiment, in which a grating patterned light is irradiated, is applied when the roughness of the measurement target is higher than a predetermined value, and the exemplary embodiment, in which a light is irradiated, is applied when the roughness of the measurement target is lower than the predetermined value.

That is, the object region and the ground region are discriminated through a first step when the surface roughness of the measurement target is lower than a predetermined value. According to the first step, a light through the light source generating a light irradiated toward the measurement target, and the light reflected by the measurement target is received to capture an image. Then, object region and the ground region are discriminated by using the image. In detail, intensity of each position in the inspection region is obtained from the image, and a grayscale histogram is generated by setting the intensity to be a first axis and the number of positions corresponding to the intensity to be a second axis. Then, the boundary between the object region and the ground region is determined to discriminate the object region and the ground region. Alternatively, colored light may be irradiated onto an inspection region to capture an image, and color information of each position of the image, which discriminates material, may be obtained to generate a color information map. Then, the object region in which the measurement target is disposed and the ground region that is a base for measuring height of the measurement target, are discriminated by using the color information map.

On the contrary, the object region and the ground region are discriminated through a second step when the surface roughness of the measurement target is higher than a predetermined value. According to the second step, a the grating patterned light through the light source generating the grating patterned light is irradiated onto a measurement target in at least one direction, shifting a grating pattern, to obtain a grating patterned image by receiving the grating patterned light reflected by the measurement target. Then, the object region and the ground region are discriminated by using the patterned image.

In detail, a resultant image of at least one of average, maximum value, minimum value, modulation, visibility, phase and signal to noise ratio are obtained in each position of the grating patterned image. Then, the object region and the ground region are discriminated by using a merged image of the resultant image in at least one direction.

As described above, according to the present invention, the object region and the ground region are easily discriminated when measuring three dimensional shape. Therefore, measurement accuracy may be enhanced by coinciding ground phases of the ground regions in the inspection region measured in at least two directions.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of discriminating between an object region and a ground region, the method comprising:
   irradiating a measurement target with grating patterned lights from at least two different directions, changing grating pattern, to obtain grating patterned images by receiving the grating patterned light reflected by the measurement target;
   removing shadow regions from each of the obtained grating images by using a phase of each of the grating patterned images, wherein the shadow region is a region where the grating pattern light is shielded by an object to generate an actual shadow;
   obtaining a resultant image of at least one of average, maximum value, minimum value, modulation, visibility, phase and signal to noise ratio in each position of the grating patterned image; and
   discriminating the object region and the ground region by using the resultant image.

2. The method of claim 1, wherein discriminating the object region and the ground region by using the resultant image, comprises:
   generating a merged image of at least one of a logical product image, a logical sum image and an image generated by subtracting the logical product image from the logical sum image, of the resultant image in the at least two directions.

3. A method of measuring three dimensional shape, the method comprising:
   irradiating a substrate with a plurality of patterned lights in different directions to capture patterned images by receiving the patterned light reflected by the substrate;
   removing shadow regions from each of the captured patterned images by using a phase of each of the grating patterned images, wherein the shadow region is a region where the grating pattern light is shielded by an object on the substrate to generate an actual shadow;
   merging the patterned images to generate an image;
   obtaining intensity of each position in the inspection region from the image;
   generating a grayscale histogram by setting the intensity to be a first axis and the number of positions corresponding to the intensity to be a second axis;
   obtaining height of each position in the inspection region by using the patterned images;
   discriminating an object region and a ground region by using the histogram; and
   setting up a height of the ground region as a ground height with respect to a measurement target.

4. The method of claim 3, wherein the inspection region is set up such that the inspection region includes at least two measurement targets, and the ground region is set up to be a ground region of one of the two measurement target.

5. The method of claim 3, wherein the inspection region is a field of view (FOV), and the ground region is a common ground region of all measurement targets in the FOV.

6. The method of claim 3, wherein a top surface of the measurement target is flat.

7. The method of claim 3, wherein discriminating an object region and a ground region by using the histogram, comprises:
   determining a region corresponding to the minimum number in the grayscale histogram to be the boundary between the object region and the ground region, or positions to be the boundary between the object region and the ground region, the positions being determined such that the object region expand toward the boundary region.

* * * * *